US009101796B2

(12) United States Patent
Ichikawa et al.

(10) Patent No.: US 9,101,796 B2
(45) Date of Patent: *Aug. 11, 2015

(54) GOLF BALL HAVING AN OVER-INDEXED THERMOPLASTIC POLYURETHANE ELASTOMER COVER AND HAVING A SOFT FEELING WHEN HIT

(75) Inventors: Yasushi Ichikawa, Tualatin, OR (US); Thomas J. Kennedy, III, Wilbraham, MA (US); Chen-Tai Liu, Yun-lin Hsien (TW); Chien-Hsin Chou, Yun-lin Hsien (TW); Hui-Kai Liao, Yun-lin Hsien (TW)

(73) Assignee: NIKE, Inc., Beaverton, OR (US)

( * ) Notice: Subject to any disclaimer, the term of this patent is extended or adjusted under 35 U.S.C. 154(b) by 411 days.

This patent is subject to a terminal disclaimer.

(21) Appl. No.: 13/342,564

(22) Filed: Jan. 3, 2012

(65) Prior Publication Data

US 2013/0172117 A1 Jul. 4, 2013
US 2013/0344995 A9 Dec. 26, 2013

(51) Int. Cl.
A63B 37/00 (2006.01)
A63B 37/12 (2006.01)
C08G 18/86 (2006.01)
C08G 18/67 (2006.01)
C08G 18/30 (2006.01)
C08G 18/48 (2006.01)
C08G 18/66 (2006.01)

(52) U.S. Cl.
CPC ......... *A63B 37/0045* (2013.01); *A63B 37/0003* (2013.01); *A63B 37/0031* (2013.01); *A63B 37/0037* (2013.01); *A63B 37/0041* (2013.01); *A63B 37/0043* (2013.01); *A63B 37/0061* (2013.01); *A63B 37/0064* (2013.01); *A63B 37/0076* (2013.01); *A63B 37/0078* (2013.01); *C08G 18/302* (2013.01); *C08G 18/4854* (2013.01); *C08G 18/6674* (2013.01); *C08G 18/675* (2013.01); *C08G 18/86* (2013.01); *A63B 37/0051* (2013.01)

(58) Field of Classification Search
None
See application file for complete search history.

(56) References Cited

U.S. PATENT DOCUMENTS

| | | | |
|---|---|---|---|
| 3,395,109 A | 7/1968 | Molitor et al. | |
| 3,454,280 A | 7/1969 | Harrison et al. | |
| 3,819,768 A | 6/1974 | Molitor | |
| 3,989,568 A | 11/1976 | Isaac | |
| 4,123,061 A | 10/1978 | Dusbiber | |
| 4,248,432 A | 2/1981 | Hewitt et al. | |
| 4,293,679 A | 10/1981 | Cogliano | |
| 4,323,247 A | 4/1982 | Keches et al. | |
| 4,442,282 A * | 4/1984 | Kolycheck | 528/83 |
| 4,526,375 A | 7/1985 | Nakade | |
| 4,884,814 A | 12/1989 | Sullivan | |
| 4,911,451 A | 3/1990 | Sullivan et al. | |
| 5,334,673 A | 8/1994 | Wu | |
| 5,885,172 A | 3/1999 | Hebert et al. | |
| 6,719,646 B2 | 4/2004 | Calabria et al. | |
| 7,208,562 B2 | 4/2007 | Kennedy, III et al. | |
| 7,481,956 B2 | 1/2009 | Wu et al. | |
| 7,524,251 B2 | 4/2009 | Melanson et al. | |
| 8,193,296 B2 | 6/2012 | Ishii et al. | |
| 2003/0065124 A1 | 4/2003 | Rosenberg et al. | |
| 2003/0203771 A1 | 10/2003 | Rosenberg et al. | |
| 2004/0157945 A1 | 8/2004 | Barber | |
| 2004/0201133 A1 | 10/2004 | Dewanjee et al. | |
| 2004/0219995 A1 | 11/2004 | Sullivan | |
| 2007/0117656 A1* | 5/2007 | Rajagopalan et al. | 473/371 |
| 2007/0246859 A1 | 10/2007 | Hogge et al. | |
| 2008/0274827 A1 | 11/2008 | Matroni et al. | |
| 2009/0124417 A1* | 5/2009 | Sullivan et al. | 473/373 |
| 2009/0198036 A1 | 8/2009 | Duffy | |
| 2010/0179002 A1 | 7/2010 | Kim et al. | |
| 2010/0331113 A1 | 12/2010 | Shiga et al. | |
| 2011/0064883 A1 | 3/2011 | Goodwin | |
| 2011/0081492 A1 | 4/2011 | Michalewich et al. | |
| 2011/0105245 A1 | 5/2011 | Rajagopalan et al. | |
| 2011/0177883 A1 | 7/2011 | Tutmark | |
| 2011/0256961 A1 | 10/2011 | Rajagopalan et al. | |
| 2012/0077621 A1* | 3/2012 | Ishii et al. | 473/376 |
| 2012/0225738 A1 | 9/2012 | Ishii et al. | |
| 2013/0172118 A1* | 7/2013 | Ichikawa et al. | 473/376 |
| 2013/0172122 A1* | 7/2013 | Ichikawa et al. | 473/378 |

FOREIGN PATENT DOCUMENTS

| | | | |
|---|---|---|---|
| CA | 2708471 | * | 9/2010 |
| EP | 0632077 A2 | | 1/1995 |
| KR | 10-1047087 B1 | | 7/2011 |

OTHER PUBLICATIONS

Notification of Transmittal of the International Search Report and the Written Opinion of the International Searching Authority mailed on May 29, 2013 in connection with International Patent Application Serial No. PCT/US2013/020083; 14 pages.
Notification of Transmittal of the International Search Report and the Written Opinion of the International Searching Authority mailed on May 29, 2013 in connection with International Patent Application Serial No. PCT/US2013/020078; 14 pages.
Notification of Transmittal of the International Search Report and the Written Opinion of the International Searching Authority mailed on May 10, 2013 in connection with International Patent Application Serial No. PCT/US2013/020013; 12 pages.

* cited by examiner

*Primary Examiner* — David Buttner
(74) *Attorney, Agent, or Firm* — Honigman Miller Schwartz & Cohn LLP; Anna M. Budde; Jonathan P. O'Brien

(57) ABSTRACT

A golf ball having an over-indexed thermoplastic polyurethane elastomer cover and having a soft feeling when hit. The golf ball cover also may be cross-linked.

14 Claims, 1 Drawing Sheet

GOLF BALL HAVING AN OVER-INDEXED THERMOPLASTIC POLYURETHANE ELASTOMER COVER AND HAVING A SOFT FEELING WHEN HIT

BACKGROUND OF THE INVENTION

1. Field of the Invention

The present invention relates to a golf ball having an over-indexed thermoplastic polyurethane elastomer cover and having a soft feeling when hit. The thermoplastic polyurethane elastomer also may be cross-linked.

2. Description of Related Art

Golf ball covers are generally divided into two types: thermoplastic covers and thermoset covers. Thermoplastic polymer materials may be reversibly melted, and so may be used in a variety of manufacturing techniques, such as compression molding, that take advantage of this property. On the other hand, thermoset polymer materials are generally formed by mixing two or more components to form a cured polymer material that cannot be re-melted or re-worked. Each type of polymer material present advantages and disadvantages when used to manufacture golf balls.

Thermoplastic materials for golf ball covers usually include ionomer resin, highly neutralized acid polymer composition, polyamide resin, polyester resin, polyurethane resin, and mixtures thereof. Among these, ionomer resin and polyurethane resin are popular materials for golf ball covers.

Ionomer resins, such as Surlyn® products (commercially available from E. I. DuPont de Nemours and Company), have conventionally been used for golf ball covers. For example, Dunlop Rubber Company obtained the first patent on the use of Surlyn® for the cover of a golf ball, U.S. Pat. No. 3,454,280 issued Jul. 8, 1969. Since then, there have been a number of disclosures on the use of ionomer resins in the cover composition of a golf ball, for example, U.S. Pat. Nos. 3,819,768, 4,323,247, 4,526,375, 4,884,814 and 4,911,451.

However, ionomer resin covered golf balls suffer from the problem that the cover surface may be scraped off by grooves on a clubface during repeated shots, particularly with irons. In other words, ionomer covers have poor scuff resistance. Also, ionomer covered balls usually have inferior spin and feel properties as compared to balata rubber or polyurethane covered balls. The use of softer ionomer resins for the cover will improve spin and feel to some extent, but will also compromise the resilience of the golf balls because such balls usually have a lower coefficient of restitution (COR). Furthermore, the scuff resistance of such softer ionomer covers is often still not satisfactory.

Thermoplastic polyurethane elastomers may also be used as the cover material, as described in (for example) U.S. Pat. Nos. 3,395,109, 4,248,432 and 4,442,282. However, the thermoplastic polyurethane elastomers disclosed therein do not satisfy all the requirements of moldability, hitting feel, control, resilience, and scuff resistance upon iron shots.

US Patent Application Publication No. 2011/0081492 (the '492 publication) disclosed a method of curing polyurethane composition for use in constructing golf balls by i) mixing isocyanate and polyol compounds to produce a polyurethane prepolymer; ii) chemically-curing the prepolymer by reacting it with a hydroxyl-terminated curing agent at a stoichiometric ratio of isocyanate groups to hydroxyl groups of at least 1.20:1.00 to form a composition; iii) applying the composition over the core and allowing it to partially-cure; and iv) moisture-curing the composition to form a fully-cured cover layer comprising a polyurethane/urea composition. However, the '492 publication fails to teach or suggest controlling a ratio of the organic isocyanate to the long chain polyol from 1.06:1.00 to 1.18:1.00. Also, the '492 publication fails to teach or suggest to use a cross-linked thermoplastic polyurethane having cross-links located in the hard segments as an outer cover layer and a small thermoplastic inner core layer.

On the other hand, thermoset polymer materials such as polyurethane elastomers, polyamide elastomers, polyurea elastomers, diene-containing polymer, cross-linked metallocene catalyzed polyolefin, and silicone, may also be used to manufacture golf balls. Among these materials, thermoset polyurethane elastomers are popular.

Many attempts, such as are described in U.S. Pat. Nos. 3,989,568, 4,123,061, 5,334,673, and 5,885,172, have been made to use thermoset polyurethane elastomers as a substitute for balata rubber and ionomer resins. Thermoset polyurethane elastomers are relatively inexpensive and offer good hitting feel and good scuff resistance. Particularly, thermoset polyurethane elastomers may present improvements in the scuff resistance as compared to softened ionomer resin blends. However, thermoset materials require complex manufacturing processes to introduce the raw material and then effect a curing reaction, which causes the manufacturing process to be less efficient.

Scuff-resistant, durable materials also are important in other technologies. For example, articles such as livestock identity tags, shoe soles, and sports balls of many types, require a durable, scuff-resistant surface.

Accordingly, for the foregoing reasons, there is a need in the art for a system and method that addresses the shortcomings of the prior art discussed above.

SUMMARY OF THE INVENTION

In one aspect, this disclosure relates to an over-indexed thermoplastic polyurethane elastomer and to a method of making the thermoplastic polyurethane elastomer. The thermoplastic polyurethane elastomer has a 100% modulus of less than about 150 kg/cm$^2$. The thermoplastic polyurethane elastomer has an NCO index of at least about 1.01, typically at least about 1.06, and more typically between about 1.06 and about 1.35, and further typically between about 1.06 and about 1.18.

In another aspect, this disclosure relates to an over-indexed cross-linked thermoplastic polyurethane (TPU) elastomer, and to a method for making the TPU elastomer. The thermoplastic polyurethane elastomer has a 100% modulus of less than about 150 kg/cm$^2$. The thermoplastic polyurethane elastomer has an NCO index of at least about 1.01, typically at least about 1.06, and more typically between about 1.06 and about 1.35, and further typically between about 1.06 and about 1.18.

The TPU elastomer has hard segments and soft segments, with cross-links in the hard segments. The cross-links are the reaction product of unsaturated bonds pendant from the hard segments, as catalyzed by a free-radical initiator.

The over-indexed cross-linked thermoplastic polyurethane elastomer precursor is the reaction product formed from reacting (a) a stoichiometric excess of at least about 1 mol percent of organic isocyanate moieties to the hydroxyl (or oxyhydrogen) moieties of the other reactants in the reaction product with a mixture of the following reactants:

(b) an unsaturated diol, having two primary hydroxyl groups and at least one allyl ether side group, of the formula

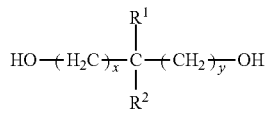

in which $R^1$ may be any substituted or unsubstituted alkyl, substituted or unsubstituted aryl, substituted or unsubstituted alkyl-aryl group, substituted or unsubstituted ether group, substituted or unsubstituted ester group, any combination of the above groups, or H, and may optionally include an unsaturated bond in any main chain or side chain of any group; $R^2$ may be any suitable substituted or unsubstituted alkyl, substituted or unsubstituted aryl, substituted or unsubstituted alkyl-aryl group, substituted or unsubstituted ether group, substituted or unsubstituted ester group, any combination of the above groups; and $R^2$ includes an allyl group; and x and y are integers independently having any value from 1 to 10;

(c) a chain extender, having at least two reaction sites with isocyanates and having a molecular weight of less than about 450;

(d) a long chain polyol having a molecular weight of between about 500 and about 4,000; and (e) a sufficient amount of free radical initiator, so as to be capable of generating free radicals that induce cross-linking structures in the hard segments by free radical initiation.

The composition exhibits a dual cure phenomenon. A precursor composition provides a partial cure, and then the composition is moisture-cured to form a polyurethane/urea hybrid composition, which is the over-indexed cross-linked thermoplastic polyurethane elastomer disclosed herein.

Another aspect of the disclosure is directed to articles that require a scuff-resistant surface. Such articles, or the surfaces thereof, can be made from the over-indexed, optionally cross-linked thermoplastic polyurethane elastomer of the disclosure, just as with the method of making golf balls disclosed herein.

In another aspect, this disclosure provides a method of making a golf ball generally comprising the steps of forming a golf ball precursor having at least one preselected layer or piece but not an outer cover, and in particular comprising the steps of: forming an inner core layer comprising a highly neutralized acid polymer; forming an outer core layer substantially surrounding the inner core layer; forming an inner cover layer substantially surrounding the outer core layer to form an embodiment of a golf ball precursor; forming an outer cover layer substantially surrounding the golf ball precursor or the inner cover layer; and wherein the outer cover layer comprises a composition of an over-indexed thermoplastic polyurethane elastomer.

In yet another aspect, the over-indexed thermoplastic polyurethane elastomer used to form the outer cover layer includes cross-links, and particularly cross-links formed from allyl ether side groups. The over-indexed cross-linked thermoplastic polyurethane elastomer is the reaction product formed from reacting:

(a) a stoichiometric excess of at least about 1 mol percent of organic isocyanate moieties to the hydroxyl (or oxyhydrogen) moieties of the other reactants in the reaction product with a mixture of the following reactants:

(b) an unsaturated diol, having two primary hydroxyl groups and at least one allyl ether side group, of the formula

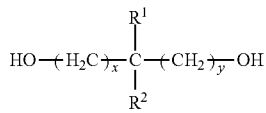

in which $R^1$ may be any substituted or unsubstituted alkyl, substituted or unsubstituted aryl, substituted or unsubstituted alkyl-aryl group, substituted or unsubstituted ether group, substituted or unsubstituted ester group, any combination of the above groups, or H, and may optionally include an unsaturated bond in any main chain or side chain of any group; $R^2$ may be any suitable substituted or unsubstituted alkyl, substituted or unsubstituted aryl, substituted or unsubstituted alkyl-aryl group, substituted or unsubstituted ether group, substituted or unsubstituted ester group, any combination of the above groups; and $R^2$ includes an allyl group; and x and y are integers independently having any value from 1 to 10;

(c) a chain extender, having at least two reaction sites with isocyanates and having a molecular weight of less than about 450;

(d) a long chain polyol having a molecular weight of between about 500 and about 4,000; and (e) a sufficient amount of free radical initiator, so as to be capable of generating free radicals that induce cross-linking structures in the hard segments by free radical initiation to form a cover layer comprising over-indexed cross-linked thermoplastic polyurethane elastomer precursor on the golf ball. The precursor then is treated with moisture to cure the precursor and form an over-indexed cross-linked thermoplastic polyurethane elastomer outer cover layer on the golf ball.

The disclosure also relates to golf balls made in accordance with the disclosure. In embodiments of the present disclosure, the molar ratio of the organic isocyanate to the long chain polyol is greater than about 1.01:1.00, and more typically greater than about 1.06:1.00. In embodiments of the disclosure, the outer cover of the golf ball has a 100% modulus of less than about 150 kg/cm².

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawing and description. The components in the figure are not necessarily to scale, emphasis instead being placed upon illustrating the principles of the invention. Moreover, in the figure, like reference numerals designate corresponding parts throughout the different views.

DETAILED DESCRIPTION

Figure 1:
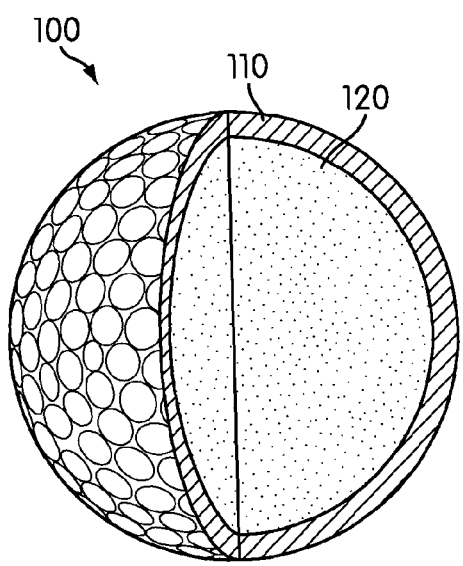
FIG. 1 shows a golf ball having aspects in accordance with this disclosure, the golf ball being of a two-piece construction.

As used herein, unless otherwise stated, compression deformation, hardness, COR, flexural modulus, and Vicat softening temperature are measured as follows:

A. Compression deformation: The compression deformation herein indicates the deformation amount of the ball, or any portion thereof, under a force; specifically, when the force is increased to become 130 kg from 10 kg, the deformation amount of the ball or portion thereof under the force of 130 kg reduced by the deformation amount of the ball or portion thereof under the force of 10 kg is the compression deformation value of the ball or portion thereof.

B. Hardness: Hardness of a golf ball layer is measured generally in accordance with ASTM D-2240, but measured on the land area of a curved surface of a molded ball.

C. Method of measuring COR: A golf ball for test is fired by an air cannon at an initial velocity of 40 m/sec, and a speed monitoring device is located over a distance of 0.6 to 0.9 meters from the cannon. The golf ball strikes a steel plate positioned about 1.2 meters away from the air cannon and rebounds through the speed-monitoring device. The return velocity divided by the initial velocity is the COR.

D. Flexural modulus: Measured in accordance with ASTM D-790.

E. Vicat softening temperature: Measured in accordance with ASTM D-1525.

F. 100% Modulus: Also known as M100—measured in accordance with ASTM D-412.

Generally, this disclosure provides an over-indexed thermoplastic polyurethane elastomer and a method of making the over-indexed thermoplastic polyurethane elastomer. In some embodiments, the thermoplastic polyurethane elastomer is cross-linked, i.e., cross-links are formed in the hard segments. The over-indexed, optionally cross-linked thermoplastic polyurethane composition exhibits a dual cure phenomenon.

This disclosure also provides a method of making articles, particularly golf balls, from an over-indexed, optionally cross-linked, thermoplastic polyurethane elastomer. In particular, in some embodiments relating to golf balls, the outer cover layer is made from over-indexed, optionally cross-linked thermoplastic polyurethane. As a result of the dual cure phenomenon, the scuff resistance of a golf ball's outer cover, or of the outer surface of any article, may be greatly improved. The over-indexed, cross-linked thermoplastic polyurethane elastomer exhibits superior scuff resistance. The low 100% modulus gives a softer feel to the golf ball when struck.

The aspects of this disclosure that relate to use of over-indexed, optionally cross-linked, thermoplastic polyurethane in a golf ball may be applied to any golf ball precursor having any number of layers or pieces. The construction of a golf ball made according to the present method is not limited to the embodiments mentioned with specificity herein. For example, a golf ball in accordance with this disclosure may generally take any construction, such as a regulation or non-regulation construction. Regulation golf balls are golf balls which meet the Rules of Golf as approved by the United States Golf Association (USGA).

Figure 2:
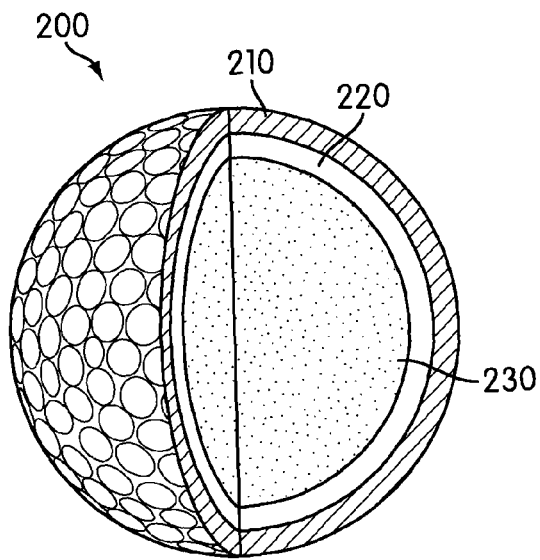
FIG. 2 shows a second golf ball having aspects in accordance with this disclosure, the second golf ball having an inner cover layer and an outer cover layer.
Figure 3:
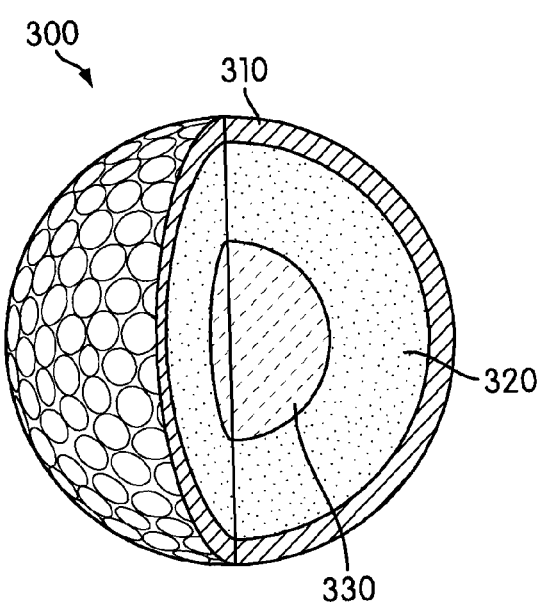
FIG. 3 shows a third golf ball having aspects in accordance with this disclosure, the third golf ball having an inner core layer and an outer core layer.
Figure 4:
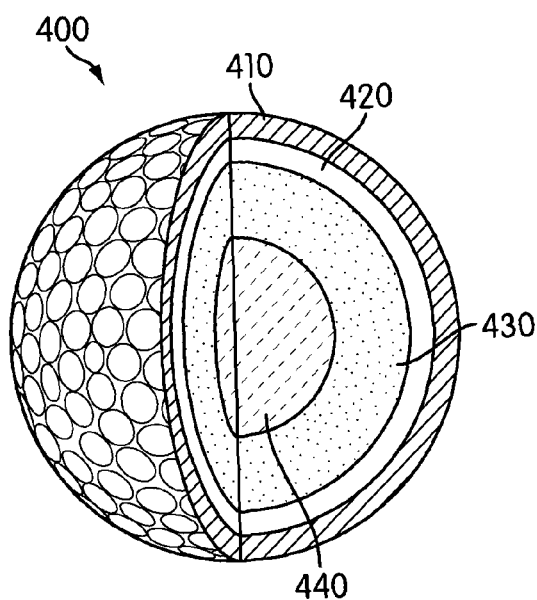
FIG. 4 shows a fourth golf ball having aspects in accordance with this disclosure, the four golf ball having an inner core layer, an outer core layer, an inner cover layer, and an outer cover layer.

Thus, the disclosure herein can be applied to any of the balls illustrated in FIGS. 1-4. For example, FIG. 1 shows a golf ball 100 having a two-piece construction comprising core 120 and cover layer 110. FIG. 2 shows a second golf ball 200 having a three-piece construction comprising core 230, inner cover layer 220, and an outer cover layer 210. FIG. 3 shows a third golf ball 300 having a three-piece construction comprising inner core layer 330, an outer core layer 320, and outer cover layer 310. FIG. 4 shows a fourth golf ball 400 having inner core layer 440, outer core layer 430, inner cover layer 420, and outer cover layer 410. Typically, each layer essentially encompasses interior layers.

The disclosure thus encompasses these golf balls, and golf balls having 5 or more layers, or pieces. However, for convenience herein, the disclosure will be directed to a four-piece, or four-layer, ball.

FIG. 4 shows a golf ball 400 made in accordance with the method of the present invention. Golf ball 400 includes an inner core layer 440, an outer core layer 430 substantially surrounding inner core layer 440, an inner cover layer 420 substantially surrounding outer core layer 430, and an outer cover layer 410 substantially surrounding inner cover layer 420, wherein outer cover 410 comprises the over-indexed, optionally cross-linked, thermoplastic polyurethane elastomer disclosed herein.

In some embodiments of the present invention, outer cover layer 410 may have a material Shore D hardness (measured on a slab) of from about 30 to about 45 and a ball surface Shore D hardness of from about 45 to about 60. Typically, the ball surface Shore D hardness is from about 50 to about 60, more typically from about 53 to about 57. In some embodiments of the present invention, outer cover layer 410 may have a ball surface Shore C hardness of from about 70 to about 90. Typically, the ball surface Shore C hardness is from about 75 to about 85. Outer cover layer 410 may have a flexural modulus of less than about 1,000 psi, typically less than about 800 psi.

Both the over-indexed thermoplastic polyurethane elastomer and the over-indexed cross-linked thermoplastic polyurethane elastomer may include hard segments and soft segments, as thermoplastic polyurethanes are known to include. Thermoplastic polyurethanes are generally made up of (1) a long chain polyol, (2) a relatively short chain extender, and (3) a diisocyanate. Once reacted, the portions of the polymer chain made up of the chain extender and diisocyanate generally align themselves into semi-crystalline structures through weak (i.e., non-covalent) association, such as through Van der Waals forces, dipole-dipole interactions or hydrogen bonding. These portions are commonly referred to as the hard segments, because the semi-crystalline structure is harder than the amorphous portions made up of the long chain polyol.

The over-indexed cross-linked thermoplastic polyurethane may include cross-links located specifically in the hard segments. These cross-links may be the reaction product of unsaturated bonds located in the hard segments, as catalyzed by a free radical initiator. These unsaturated bonds may be introduced into the hard segments by the use of unsaturated diols as chain extenders. In particular embodiments, the cross-links may be formed from allyl ether side groups present in the hard segments.

To form the over-indexed, optionally cross-linked thermoplastic polyurethane elastomer, a precursor comprising a stoichiometric excess of isocyanate moieties is formed into the desired shape and then is treated with moisture to cure the precursor and form an over-indexed cross-linked thermoplastic polyurethane elastomer. Thus, an article can be fully cured in this way, and if the thermoplastic polyurethane elastomer precursor is used to form an outer cover layer on the golf ball, the thermoplastic polyurethane elastomer is formed in place on the golf ball.

The above-mentioned chemical groups may have their conventional definitions as is generally known in the art of chemistry. Specifically, an unsubstituted alkyl group includes any chemical group comprising only carbon and hydrogen linked by single bonds. A substituted alkyl group may include atoms other than carbon and hydrogen in a side chain portion, such as a halogen group, an inorganic group, or other well-known functional groups. In some embodiments, a substituted or unsubstituted alkyl group may include from 1 to about 100 carbon atoms in the alkyl chain. In other embodiments, a substituted or unsubstituted alkyl group may have from 1 to 10 carbon atoms in the alkyl chain. An alkyl group, or any portion thereof, or alkyl substituent, may be a straight chain or branched.

As is further known in the art of chemistry, an aryl group is defined as any group that includes an aromatic benzene ring. Furthermore, an alkyl-aryl group includes at least one aromatic benzene ring in addition to at least one alkyl carbon. An ether group includes at least one oxygen atom bonded to two carbon atoms. An ester group includes at least one carbon atom that is double bonded to a first oxygen atom and single bonded to a second oxygen atom.

In some embodiments substituted groups, such as a substituted alkyl group or a substitute aryl group, may be substituted with another of the same group. For example, an alkyl may be substituted with another alkyl to create a branched alkyl group. In other embodiments substituted groups may be substituted with a different group, for example an alkyl may be substituted with an ether group, or an ether group may be substituted with an alkyl group. A person having ordinary skill in the art of chemistry may also synthesize suitable combinations of these groups, as may be desired.

The method of the present disclosure, and the products manufactured therefrom, include a molar ratio of the organic isocyanate moieties to the hydroxyl (or oxyhydrogen) moieties of the other reactants is at least about 1.01:1.00, typically at least about 1.06:1.00, more typically from about 1.06:1.00 to about 1.18:1.00, or from about 1.10:1.00 to about 1.15:1.00. The disclosure also contemplates embodiments in which the molar ratio is between about 1.01:1.00 to about 1.35:1.00, typically between about 1.06:1.00 to about 1.35:1.00, and more typically between about 1.06:1.00 and about 1.25:1.00.

The skilled practitioner recognizes that this molar ratio of isocyanate moieties to hydroxyl moieties is known as the "NCO index" or, simply, the Index. Thus, the molar ratio of 1.06:1.00 would be expressed as an index of 1.06. The terms 'index' and 'molar ratio' are used interchangeably herein.

Additional cross-linking agents also may be incorporated in the thermoplastic polyurethane elastomer disclosed herein. These agents have at least 2 functional groups. Each such unsaturated functional group reacts with the unsaturated moieties in the unsaturated diol of different polyurethane molecules by free-radical or other polymerization to cross-link the molecules.

Each of the above listed reactants will be discussed in further detail, with the understanding that any particular embodiment of a specific reactant may be mixed and matched with any other specific embodiment of another reactant according to the general formulation above. Furthermore, any reactant may generally be used in combination with other reactants of the same type, such that any list herein may be assumed to include mixtures thereof, unless otherwise specified.

The organic isocyanate may include any of the known aromatic, aliphatic, and cycloaliphatic di- or poly-isocyanates. Examples of suitable isocyanates include: 2,2'-, 2,4'-(and particularly) 4,4'-diphenylmethane diisocyanate (MDI), and isomeric mixtures thereof; polyphenylene polymethylene polyisocyanates(poly-MDI, PMDI); 2,4- and 2,6-toluene diisocyanates, and isomeric mixtures thereof such as an 80:20 mixture of the 2,4- and 2,6-isomers (TDI); the saturated, isophorone diisocyanate; 1,4-diisocyanatobutane; 1,5-diisocyanatopentane; 1,6-diisocyanatohexane; 1,4-cyclohexane diisocyanate; cycloaliphatic analogs of PMDI; and the like.

Suitable chain extenders may include the common diols, such as ethylene glycol, diethylene glycol, triethylene glycol, propylene glycol, dipropylene glycol, tripropylene glycol, 1,3-propanediol, 1,4-butanediol, 1,6-hexanediol, 1,10-decanediol, neopentyl glycol, dihydroxyethoxy hydroquinone, 1,4-cyclo-hexanedimethanol, 1,4-dihydroxycyclohexane, and the like. Minor amounts of cross-linking agents such as glycerine, trimethylolpropane, diethanolamine, and triethanolamine may be used in conjunction with the diol chain extenders.

The skilled practitioner recognizes that the reaction product of isocyanate and hydroxyl moieties is a urethane. However, isocyanate also is reactive with amines, with the reaction product forming a urea. Therefore, in addition to the common diol chain extenders, diamines and amino alcohols may also be used to make over-indexed cross-linked thermoplastic polyurethane elastomer. Examples of suitable diamines include aliphatic, cycloaliphatic, or aromatic diamines. In particular, a diamine chain extender may be ethylene diamine, hexamethylene diamine, 1,4-cyclohexylene diamine, benzidine, toluene diamine, diaminodiphenyl methane, the isomers of phenylene diamine or hydrazine. Aromatic amines may also be used, such as MOCA (4,4'-methylene-bis-o-chloroaniline), M-CDEA (4,4'-methylenebis(3-chloro-2,6-diethyl-aniline)). Examples of suitable amino alcohols, which can result in both urea and urethane structures, include ethanol amine, N-methylethanolamine, N-butylethanolamine, N-oleylethanolamine, N-cyclohexylisopropanolamine, and the like. Mixtures of various types of chain extenders may also be used to form the cross-linked thermoplastic polyurethane.

The long chain polyol ("the polyol") may generally be a polyester polyol or a polyether polyol. Accordingly, the over-indexed cross-linked thermoplastic polyurethane may be either general type of polyurethane: a polyether-based polyurethane elastomer or a polyester-based polyurethane elastomer, or mixtures thereof.

The long chain polyol may be a polyhydroxy compound having a molecular weight between 500 and 4,000. Suitable long chain polyols may generally include linear polyesters, polyethers, polycarbonates, polylactones (e.g., ε-caprolactone), and mixtures thereof. In addition to polyols having hydroxyl terminal groups, the polyol may include carboxyl, amino or mercapto terminal groups.

Polyester polyols are produced by the reaction of dicarboxylic acids and diols or an esterifiable derivative thereof. Examples of suitable dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. Examples of suitable diols include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, and the like. Both of the dicarboxylic acids and diols can be used individually or in mixtures to make specific polyesters in the practice applications.

Polyether polyols are prepared by the ring-opening addition polymerization of an alkylene oxide with an initiator of a polyhydric alcohol. Examples of suitable polyether polyols are polypropylene glycol (PPG), polyethylene glycol (PEG), polytetramethylene ether glycol (PTMEG). Block copolymers such as combinations of polyoxypropylene and polyoxyethylene glycols, poly-1,2-oxybutylene and polyoxyethylene glycols, poly-1,4-tetramethylene and polyoxyethylene glycols are also preferred in the present invention.

Polycarbonate polyols are made through a condensation reaction of diols with phosgene, chloroformic acid ester, dialkyl carbonate or diallyl carbonate. Examples of diols in the suitable polycarbonate polyols of the cross-linked thermoplastic polyurethane elastomers are ethanediol, diethylene glycol, 1,3-butanediol, 1,4-butanediol, 1,6-hexanediol, neopentylglycol, and 1,5-pentanediol.

Additional di- or multi-functional cross-linking agents also may be included in the thermoplastic polyurethane elastomer. One class of suitable compounds is diacrylates, particularly diacrylates having terminal unsaturation. One such compound is 1,6-hexanediol diacrylate, a commercially-available product. Other similar diacrylates also are suitable.

The over-indexed cross-linked thermoplastic polyurethane elastomer may comprise a sufficient amount of free radical initiator so as to be capable of inducing cross-linking structures in the hard segments by free radical initiation at the unsaturated moiety. The free radical initiator may generate free radicals through thermal cleavage or UV radiation. When the half-life of the free radical initiator and its operation temperature are considered in the manufacturing process, the weight ratio of initiators to unsaturated diols may be from 100:0.1 to 100:100. In particular embodiments, the weight ratio of free radical initiator to unsaturated diols may be about 5:100.

A variety of known free radical initiators may be used as the radical source in order to make the over-indexed cross-linked polyurethane elastomer having a cross-linked structure. Suitable radical initiators may include peroxides, sulfurs, and sulfides, and peroxides may be particularly suitable in some embodiments. The peroxides may be aliphatic peroxides or and aromatic peroxides, or mixtures thereof. Aromatic peroxides, such as diacetylperoxide, di-tert-butylperoxide, dicumylperoxide, dibenzoylperoxide, 2,5-dimethyl-2,5-di(benzoylperoxy)hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl) may be used as the free radical initiator in some embodiments. The skilled practitioner recognizes that the free radical initiators begin to act at different temperatures. For example, dicumyl peroxide begins initiation at a higher temperature than does benzoyl peroxide. With the guidance provided herein, the skilled practitioner will be able to select a suitable initiator.

If the TPU is to be cross-linked, an unsaturated diol may generally be any diol having at least one unsaturated bond. As is generally known, an unsaturated bond may be a double bond between two carbon atoms (as in an alkene) or a triple bond (as in an alkyne). In particular embodiments, the unsaturated diol may have two primary alcohol groups. The presence of two primary alcohol groups may result in favorable reaction kinetics, such that the cross-linked thermoplastic polyurethane may be formed in an easily controlled "one step" continuous process.

In particular embodiments, the unsaturated diol may have two primary hydroxyl groups and at least one allyl ether side group, so as to be of the formula:

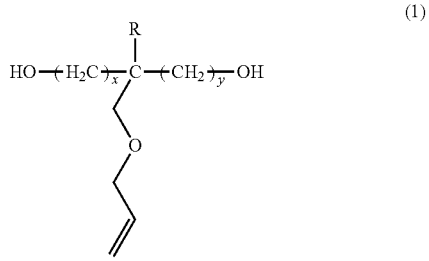

(1)

in which R is alkyl group with or without modified functional groups, and x and y are integers of 1 to 4. In particular embodiments, x and y may both have values of 1, 2, 3 or 4. In other embodiments, x and y may each have different values of between 1 and 4.

In one particular embodiment, the unsaturated diol may be trimethylolpropane monoallylether ("TMPME"). TMPME may also be named "trimethylol propane monoallyl ether", "trimethylol propane monoallylether", or "trimethylolpropane monoallyl ether." TMPME has CAS no. 682-11-1. TMPME may also be referred to as 1,3-Propanediol, 2-ethyl-2-[(2-propen-1-yloxy)methyl] or as 2-allyloxymethyl-2-ethyl-1,3-propanediol. TMPME is commercially available from Perstorp Specialty Chemicals AB.

Other suitable compounds that may be used as the unsaturated diol of formula (1) may include: 1,3-Propanediol, 2-(2-propen-1-yl)-2-[(2-propen-1-yloxy)methyl]; 1,3-Propanediol, 2-methyl-2-[(2-propen-1-yloxy)methyl]; 1,3-Propanediol, 2,2-bis[(2-propen-1-yloxy)methyl; and 1,3-Propanediol, 2-[(2,3-dibromopropoxy)methyl]-2-[(2-propen-1-yloxy)methyl]. Further compounds within the scope of formula (1) may be known to a person having ordinary skill in the art, and may be used in the present invention.

The weight ratio of cross-linked thermoplastic polyurethane elastomer to the unsaturated diols may generally be from about 100:0.1 to about 100:25. In particular embodiments, the weight ratio of cross-linked thermoplastic polyurethane elastomer to the unsaturated diols may be about 100:10.

The inventors have discovered that a stoichiometric excess of isocyanate moieties of at least about 1 mol percent, and typically at least about 6 mol percent, yields a product that resists shear failure yet remains a TPU elastomer. Thus, the over-indexed, optionally cross-linked TPU elastomer described herein is particularly suitable for thermoforming, such as forming a cover on an article or an outer cover layer on a golf ball. The outer cover layer thus would resist stress failure that typically manifests itself as corrugations or 'hairs' on the surface of the golf ball. Thus, golf ball covers and other surfaces that require stress resistance, such as livestock tags, shoe bindings, and furniture, also are suitably made with such material.

The index of over-indexed, optionally cross-linked TPU elastomer in embodiments herein is at least about 1.01, typically at least about 1.06, more typically is between about 1.06 and 1.18, and still more typically between about 1.10 and about 1.15. In other embodiments, the index is between about 1.01 and about 1.35, typically between about 1.06 and about 1.30, and more typically between about 1.06 and about 1.25. A large excess of isocyanate, for example, an index greater than about 1.35, typically is a waste of reactant and leaves unreacted isocyanate, which is a source of unintended reactions that may form corrosive and dangerous materials, even after the second curing step.

Optionally, the over-indexed, optionally cross-linked thermoplastic polyurethane elastomer may include further components such as fillers and/or additives. Fillers and additives may be used based on any of a variety of desired characteristics, such as enhancement of physical properties, UV light resistance, and other properties. For example, to improve UV light resistance, the over-indexed cross-linked thermoplastic polyurethane elastomer may include at least one light stabilizer. Light stabilizers may include hindered amines, UV stabilizers, or a mixture thereof.

Inorganic or organic fillers can be also added to the over-indexed cross-linked thermoplastic polyurethane elastomer. Suitable inorganic fillers may include silicate minerals, metal oxides, metal salts, clays, metal silicates, glass fibers, natural fibrous minerals, synthetic fibrous minerals or a mixture thereof. Suitable organic fillers may include carbon black, fullerene and/or carbon nanotubes, melamine colophony, cellulose fibers, polyamide fibers, polyacrylonitrile fibers, polyurethane fibers, polyester fibers based on aromatic and/aliphatic dicarboxylic acid esters, carbon fibers or a mixture thereof. The inorganic and organic fillers may be used individually or as a mixture thereof. The total amount of the filler may be from about 0.5 to about 30 percent by weight of the polyurethane components.

Flame retardants may also be used to improve the flame resistance of the over-indexed cross-linked thermoplastic polyurethane elastomer. Suitable flame retardants may include organic phosphates, metal phosphates, metal polyphosphates, metal oxides (such as aluminum oxide hydrate, antimony trioxide, arsenic oxide), metal salts (such as calcium sulfate, expandable graphite), and cyanuric acid derivatives (such as melamine cyanurate). These flame retardants may be used individually or as a mixture thereof, and the total amount of the flame retardant may be from about 10 to about 35 percent by weight of the polyurethane components.

To improve toughness and compression rebound, the cross-linked thermoplastic polyurethane elastomer may include at least one dispersant, such as a monomer or oligomer comprising unsaturated bonds. Examples of suitable monomers include styrene, acrylic esters; suitable oligomers include di- and tri-acrylates/methacrylates, ester acrylates/methacrylates, and urethane or urea acrylates/methacrylates. When a diacrylate-containing compound is used as a dispersant, it also may enter into the cross-linking reaction.

If the outermost layer of a golf ball, or the outer surface of an article, comprises the over-indexed cross-linked thermoplastic polyurethane elastomer, then the cross-linked thermoplastic polyurethane elastomer may include at least one white pigment to aid in better visibility. The white pigment may be selected from the group consisting of titanium dioxide, zinc oxide or a mixture thereof. Pigments of other colors may serve equally well, particularly in other articles, such as sports balls or livestock tags, for color-coding the articles, to increase visibility, or to increase the legibility of text printed thereon. With the guidance provided herein, the skilled practitioner can identify suitable additives.

The over-indexed, optionally cross-linked thermoplastic polyurethane elastomer may generally be formed by a single-screw, twin-screw, or a batch method in order to mix and react all of the ingredients described above. The products of the reaction process may be in the form of pellets or ground chips.

Over-indexed thermoplastic polyurethane elastomer precursor and over-indexed cross-linked thermoplastic polyurethane elastomer precursor can be made in any way that yields a TPU having an excess of isocyanate moieties sufficient to meet the NCO index available for a cure step in which the TPU is exposed to moisture. One method is to mix all reactants in, for example, a screw extruder and then to form small pieces, such as pellets. The pellets may be processed in any way that preserves the unreacted isocyanate moieties by limiting moisture to less than about 3,000 ppm, typically less than about 2,000 ppm, more typically less than about 1,000 ppm, and even more typically less than about 800 ppm, until the pellets are used, such as in an injection molding step, to form a portion, typically the cover, of the golf ball. After forming the golf ball, or any other object, the moisture-curing step then forms the polyurethane/polyurea hybrid that is the over-indexed, optionally cross-linked, thermoplastic polyurethane elastomer. One such method is disclosed in U.S. Application Ser. No. 61/582,658, filed on even date herewith.

The over-indexed, optionally cross-linked thermoplastic polyurethane elastomer of the disclosure may be used to make golf balls by injection molding or compression molding. Other articles can be made in the same way. Injection molding may be used in particular embodiments in order to achieve increased productivity. Generally, the free radical initiator may be added to the polymer mixture at any of several stages during manufacturing. For example, the free radical initiator may be added during extrusion of the polymer mixture, or during compression molding. Similarly, the free radical initiator may be activated so as to form cross-links during any of several stages of manufacturing. For example, the free radical initiator may be activated by heating during an extrusion process.

For any ball layer(s) other than the layer(s) comprising the over-indexed, optionally cross-linked thermoplastic polyurethane elastomer, suitable materials can be selected from any of the various materials known to be used in golf ball manufacturing. Specifically, such other materials may be selected from the following groups: (1) thermoplastic materials selected from the group consisting of ionomer resin, highly neutralized acid polymer composition, polyamide resin, polyester resin, polyurethane resin and a mixture thereof; or (2) thermoset materials selected from the group consisting of polyurethane elastomer, polyamide elastomer, polyurea elastomer, diene-containing polymer (such as polybutadiene), cross-linked metallocene catalyzed polyolefin, silicone, and a mixture thereof.

For example, in embodiments where the core construction is multilayered, the choice of the material making up the core layer or the inner core layer, such as inner core layer 330 or 440 (as shown in FIG. 3 or 4, respectively) is not particularly limited. The material making up the inner core layer may be selected from the following groups: (1) thermoplastic materials selected from the group consisting of ionomer resin, highly neutralized acid polymer composition, polyamide resin, polyester resin, polyurethane resin and a mixture thereof; or (2) thermoset materials selected from the group consisting of polyurethane elastomer, polyamide elastomer, polyurea elastomer, diene-containing polymer (such as polybutadiene), cross-linked metallocene catalyzed polyolefin, silicone, and a mixture thereof.

Among the various thermoplastic and thermoset materials, inner core layer 440 may comprise ionomer resin or highly neutralized acid polymer composition in particular embodiments. For example, Surlyn®, HPF 1000, HPF 2000, HPF AD1027, HPF AD1035, HPF AD1040, and a mixture thereof, all produced by E. I. DuPont de Nemours and Company, may be used. In some embodiments, inner core layer 440 may comprise highly neutralized acid polymer composition (HNP). In particular, to enable a broader range of properties and characteristics of the golf ball precursor, two or more HNPs may be used, typically as a mixture. The highly neutralized acid polymer composition(s) of inner core layer 440 have Vicat softening temperatures of from 50° C. to 60° C.

Suitable highly neutralized acid polymer compositions for use in forming inner core layer 440 may comprise a highly neutralized acid polymer composition and optionally additives, fillers, and/or melt flow modifiers. The acid polymer is neutralized to 70% or higher, including up to 100%, with a suitable cation source, such as magnesium, sodium, zinc, or potassium.

Suitable additives and fillers include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., inner core material that is ground and recycled; and nanofillers. Suitable melt flow modifiers include, for example, fatty acids and salts thereof, polyamides, polyesters, polyacrylates, polyurethanes, polyethers, polyureas, polyhydric alcohols, and combinations thereof.

Inner core layer 440 may be made by a fabrication method such as hot-press molding or injection molding. In embodiments of the disclosure, the diameter of inner core layer 440 may be in a range of about 21 millimeters to about 28 millimeters, or in a range of about 24 millimeters to about 28 millimeters. Inner core layer 440 may have a surface Shore D hardness of 45 to 55. Inner core layer 440 has a Shore D cross-sectional hardness of from 45 to 55 at any single point on a cross-section obtained by cutting inner core layer 440 in half, and has a Shore D cross-sectional hardness difference between any two points on the cross-section of within ±6. By controlling the Shore D hardness difference of inner core layer 440, the ball over-all performance may be stable. To have a lower ball spin rate, inner core layer 440 may have a compression deformation of from about 3.4 millimeters to about 4.2 millimeters.

To protect thermoplastic inner core layer 440 during core-forming process, it is preferred that outer core layer 430 has a thickness of from 5 millimeters to 9 millimeters and has a volume which is greater than any other layers of golf ball 400. Outer core layer 430 typically has a surface Shore D hardness of between about 50 to about 60, and the hardness of the outer core layer is greater than the Shore D hardness of inner core layer 440.

The material making up outer core layer 430 may be thermoset materials selected from the group consisting of polyurethane elastomer, polyamide elastomer, polyurea elastomer, diene-containing polymer (such as polybutadiene), cross-linked metallocene catalyzed polyolefin, silicone, and a mixture thereof. Outer core layer 430 may be made by cross-linking a polybutadiene rubber composition. When other rubber is used in combination with a polybutadiene, it is preferred that polybutadiene is included as a principal component. Specifically, a proportion of polybutadiene in the entire base rubber is preferably equal to or greater than about 50 percent by weight, and particularly preferably equal to or greater than about 80 percent by weight. A polybutadiene having a proportion of cis-1,4 bonds of equal to or greater than about 60 mol percent, and further, equal to or greater than about 80 mol percent, is preferred.

In some embodiments, cis-1,4-polybutadiene may be used as the base rubber and mixed with other ingredients. In some embodiments, the amount of cis-1,4-polybutadiene may be at least about 50 parts by weight, based on 400 parts by weight of the rubber compound. Various additives may be added to the base rubber to form a compound. The additives may include a cross-linking agent and a filler. In some embodiments, the cross-linking agent may be zinc diacrylate, magnesium acrylate, zinc methacrylate, or magnesium methacrylate. In some embodiments, zinc diacrylate may provide advantageous resilience properties. The filler may be used to increase the specific gravity of the material. The filler may include zinc oxide, barium sulfate, calcium carbonate, or magnesium carbonate. In some embodiments, zinc oxide may be selected for its advantageous properties. Metal powder, such as tungsten, may alternatively be used as a filler to achieve a desired specific gravity. In some embodiments, the specific gravity of outer core layer 430 may be from about 1.05 g/cm³ to about 1.25 g/cm³. Further, outer core layer 430 may have a surface Shore D hardness of from about 50 to about 60.

In some embodiments, a polybutadiene synthesized using a rare earth element catalyst is preferred. By using this polybutadiene, excellent resilience performance of golf ball 400 can be achieved. Examples of rare earth element catalysts include lanthanum series rare earth element compound, organoaluminum compound, and alumoxane and halogen containing compound. A lanthanum series rare earth element compound is preferred. Polybutadiene obtained by using lanthanum rare earth-based catalysts usually employ a combination of lanthanum rare earth (atomic number of 57 to 71) compounds, but particularly preferred is a neodymium compound.

Outer core layer 430 is preferably made by hot-press molding process. Suitable vulcanization conditions include a vulcanization temperature of between 130° C. and 190° C. and a vulcanization time of between 5 and 20 minutes. To obtain the desired rubber cross-linked body for use as the core in the present invention, the vulcanizing temperature is preferably at least 140° C.

When outer core layer 430 of the present invention is produced by vulcanizing and curing the rubber composition in the above-described way, advantageous use may be made of a method in which the vulcanization step is divided into two stages. The outer core layer material is placed in an outer core layer-forming mold and subjected to initial vulcanization so as to produce a pair of semi-vulcanized hemispherical cups, and then a prefabricated inner core layer is placed in one of the hemispherical cups and is covered by the other hemispherical cup, in which state complete vulcanization is carried out.

The surface of inner core layer 440 placed in the hemispherical cups may be roughened before the placement to increase adhesion between inner core layer 440 and outer core layer 430. In some embodiments, inner core layer surface is pre-coated with an adhesive or pre-treated with chemical(s) before placing inner core layer 440 in the hemispherical cups to enhance the durability of the golf ball and enable a high rebound.

Alternatively, the inner core layer may comprise the aforementioned thermoset material while the outer core layer may comprise the thermoplastic material, or any combination thereof.

In embodiments where the core construction is multilayered, the COR of the inner core layer, such as inner core layer 440 in FIG. 4, at forty (40) meters per second, may be from about 0.78 to about 0.92, and may be higher than that of the golf ball as a whole. In other embodiments, the COR of the golf ball at forty (40) meters per second may be less than about 0.8.

In a particular embodiment of this disclosure relating to a four-piece golf ball, inner core layer 440 has a COR value from about 0.785 to about 0.90, typically from about 0.795 to about 0.89, more typically from about 0.80 to about 0.88. Inner core layer 440 has a first coefficient of restitution, and golf ball 400 has a second coefficient of restitution, and the first coefficient of restitution is higher than the second coefficient of restitution by at least 0.01. Golf ball 400 of the present invention has a coefficient of restitution of less than about 0.80.

In some embodiments of the disclosure, outer core layer 430 has a COR of at least about 0.80, and the COR of outer core layer 430 is greater than the COR of inner core layer 440.

Inner cover layer 420 of the golf ball described herein may comprise a thermoplastic material. The thermoplastic material of inner cover layer 420 comprises at least one of an ionomer resin, a highly neutralized acid polymer composition, a polyamide resin, a polyurethane resin, a polyester resin, or a combination thereof. In some embodiments, inner cover layer 420 comprises the same type of over-indexed, optionally cross-linked thermoplastic polyurethane as outer cover layer 410. In some embodiments, inner cover layer 420 may comprise a cross-linked, but not over-indexed, polyurethane, or may comprise yet another uncross-linked thermoplastic polyurethane different from outer cover layer 410, while in some embodiments, inner cover layer 420 comprises a different material from outer cover layer 410.

In embodiments of the disclosure, inner cover layer 420 has a thickness of less than about 2 millimeters. In some embodiments, inner cover layer 420 of the present invention has a thickness of less than about 1.2 millimeters. In some embodiments, inner cover layer 420 of the present invention has a thickness of less than about 1 millimeter. Although inner cover layer 420 is relatively thin compared to the rest of the layers of golf ball 400, it has the highest surface Shore D hardness among all layers. In some embodiments, inner cover layer 420 has a surface Shore D hardness of from about 60 to about 70 as measured on the curved surface. Also, inner cover layer 420 has a high flexural modulus of from about 60,000 psi to about 100,000 psi, or from about 70,000 psi to about 85,000 psi. In some embodiments, the specific gravity of inner cover layer 420 may be from about 0.95 g/cm$^3$ to about 1.5 g/cm$^3$ to create a greater moment of inertia.

The compositions of this disclosure are subjected to a dual-curing process. The composition is chemically-cured when it is reacted with the diol chain extenders. Then, the resulting composition is moisture-cured in accordance with the steps described below.

The above-described chemical curing mechanism provides an over-indexed, optionally cross-linked thermoplastic polyurethane elastomer, which subsequently is fully-cured by contacting the composition with moisture. The resulting fully-cured composition has improved scuff resistance performance. Different methods may be used for applying the moisture to the composition in the moisture-curing step. For example, the partially-cured composition formed by the chemical-curing step simply may be exposed to ambient moisture for a sufficient period to fully-cure the material. Alternatively, a spray of moisture may be applied to the composition so that it fully cures. In another embodiment, a composition is soaked in hot water for one to two hours. In yet another embodiment, the composition is placed in a humidity chamber at relatively high humidity (particularly, the relative humidity (RH) is at least 50%). Preferably, the humidity chamber has a temperature of 70° C., a relative humidity of 90%, and the composition is placed in the chamber for one to two hours to achieve good curing of the composition in a relatively short period.

The skilled practitioner recognizes that, generally speaking, the higher the 100% modulus of a material, the harder the material. Indeed, the modulus, which is the force (stress) per unit area required to produce a certain elongation (strain), may be the best single gauge of a compound's overall toughness and extrusion resistance. Modulus may be determined at any elongation, with 100% being the most widely used figure for testing and comparison purposes. The 100% modulus is the modulus at 100% elongation, and also is known as "M100" (or modulus 100). The 100% modulus is the value measured herein. Compounds with a higher modulus are more resilient and more resistant to extrusion. Generally speaking, the harder a compound, the higher its modulus. Because it is basically a measure of tensile strength at a particular elongation (rather than at rupture), modulus also is known as tensile modulus or tensile stress.

As described in ASTM D-412, modulus typically is gauged on a 'dumbbell' specimen having a narrower section between two wider grip areas at the ends of the specimen. As the specimen is being stretched, the tester records the force, for example, in psi, needed to achieve the pre-selected elongation (for example, 100%).

In the present disclosure, outer cover layer 410 comprising the crosslinked thermoplastic polyurethane elastomer has a lower 100% modulus to give the golfer a softer feel when the ball is hit. In the present disclosure, outer cover layer 410 has a 100% modulus of less than about 150 kg/cm$^2$. Typically, outer cover layer 410 has a 100% modulus of less than about 140 kg/cm$^2$. More typically, outer cover layer 410 has a 100% modulus of from about 80 kg/cm$^2$ to about 130 kg/cm$^2$.

Embodiments of golf ball 400 comprising inner core layer 440, outer core layer 430, inner cover layer 420, and outer cover layer 410 has a ball compression deformation of 2.2 mm to 4 mm. In some embodiments, golf ball 400 has compression deformation of 2.5 mm to 3.5 mm. Other properties and characteristics also may be desirable for golf ball 400. In some embodiments, it may be desirable for golf ball 400 to have a moment of inertia between about 82 g/cm$^2$ and about 90 g/cm$^2$. Such a moment of inertia may produce a desirable distance and trajectory, particularly when golf ball 400 is struck with a driver or driven against the wind.

EXAMPLES

Two golf balls in accordance with the present invention were fabricated as described below, and their scuff resistance was compared to several comparative examples.

For each golf ball, the inner core layer was made from a material selected from Table 1, the outer core layer was made from a material selected from Table 2, the inner cover layer was made from a material select from Table 3, and the cover layer was made from a material selected from Table 4. The amount of the materials listed in Tables 1, 2, 3 and 4 is shown in parts by weight (pbw) or percentages by weight.

TABLE 1

| Inner Core Materials | | |
| --- | --- | --- |
| Resin: | A | B |
| HPF 2000* | 78 | 0 |
| HPF AD 1035* | 22 | 100 |

*HPF 2000 and HPF AD 1035 are trade names of ionomeric resins by E. I. DuPont de Nemours and Company.

TABLE 2

| Outer Core Material | | |
| --- | --- | --- |
| Rubber compound: | C | D |
| TAIPOL ™ BR0150* | 100 | 100 |
| Zinc diacrylate | 29 | 29 |
| Zinc oxide | 9 | 9 |
| Barium sulfate | 11 | 9 |
| Peroxide | 1 | 1 |

*TAIPOL ™ BR0150 is the trade name of a rubber produced by Taiwan Synthetic Rubber Corp.

TABLE 3

| Inner Cover Material | |
| --- | --- |
| Resin: | E |
| Neothane 6303D* | 100 |

*Neothane 6303D is the trade name of a thermoplastic polyurethane produced by Dongsung Highchem Co. LTD.

TABLE 4

| Outer Cover Materials | | | | | |
|---|---|---|---|---|---|
| | F | G | H | I | J |
| PTMEG (pbw) | 100 | 100 | 100 | 100 | 100 |
| BG (pbw) | 15 | 15 | 15 | 15 | 15 |
| TMPME (weight % to total components) | 10% | 10% | 0 | 10% | 10% |
| DCP (weight % to total components) | 0.5% | 0.5% | 0 | 0 | 0 |
| MDI (pbw) | 92.1 | 102.6 | 55.0 | 92.1 | 102.6 |
| Molar ratio of organic isocyanate to oxy-hydrogen (hydroxyl) | 1.06:1.00 | 1.18:1.00 | 1.01:1.00 | 1.06:1.00 | 1.18:1.00 |

"PTMEG" is polytetramethylene ether glycol, having a number average molecular weight of 2,000, and is commercially available from Invista, under the trade name of Terathane® 2000. "BG" is 1,4-butanediol, commercially available from BASF and other suppliers. "TMPME" is trimethylolpropane monoallylether, commercially available from Perstorp Specialty Chemicals AB. "DCP" is dicumyl peroxide, commercially available from LaPorte Chemicals Ltd. "MDI" is diphenylmethane diisocyanate, commercially available from Huntsman, under the trade name of Suprasec® 1100.

Outer cover materials F, G, H, I and J were formed by mixing PTMEG, BG, TMPME, DCP and MDI in the proportions shown. Specifically, these materials were prepared by mixing the components in a highly agitated stirrer for 1 minute, starting at a temperature of about 70° C., followed by a 10-hour post curing process at a temperature of about 100 degrees Celsius. The post cured polyurethane elastomers were ground into small chips. The manufacturing process maintained low moisture levels, including less than about 800 ppm after cooling and comminution, and less than about 300 ppm after secondary drying as described above.

From the above materials, five kinds of golf balls were manufactured, as shown in Table 5. Generally, the golf balls were manufactured using conventional compression molding and injection molding processes known in the art of golf ball manufacturing. After all golf balls were made, all golf balls were kept in an environment with a temperature of 30° C. and a relative humidity of 50 percent for 4 hours.

TABLE 5

| Golf Ball Testing Data | | | | | |
|---|---|---|---|---|---|
| | Examples | | Comparative examples | | |
| | 1 | 2 | 3 | 4 | 5 |
| Inner Core Layer | | | | | |
| Material | A | B | A | B | A |
| Diameter (mm) | 24 | 21 | 24 | 21 | 24 |
| Shore D Hardness | 53 | 46 | 53 | 46 | 53 |
| Compression Deformation (mm) | 3.2 | 4.2 | 3.2 | 4.2 | 3.2 |
| COR | 0.83 | 0.81 | 0.83 | 0.81 | 0.83 |
| Outer Core Layer | | | | | |
| Material | C | D | C | D | C |
| Thickness (mm) | 7.25 | 8.75 | 7.25 | 8.75 | 7.25 |
| Shore D Hardness | 59 | 58 | 59 | 58 | 59 |
| Inner Cover Layer | | | | | |
| Material | E | E | E | E | E |
| Thickness (mm) | 1.0 | 1.0 | 1.0 | 1.0 | 1.0 |
| Shore D Hardness | 69 | 68 | 69 | 68 | 69 |
| Flexural Modulus (psi) | 77,000 | 77,000 | 77,000 | 77,000 | 77,000 |
| Outer cover layer | | | | | |
| Resin | F | G | H | I | J |
| Thickness (mm) | 1.1 | 1.1 | 1.1 | 1.1 | 1.1 |
| Shore D Hardness | 53 | 52 | 53 | 52 | 53 |
| Flexural Modulus(psi) | 550 | 530 | 480 | 490 | 490 |
| Ball | | | | | |
| COR | 0.785 | 0.775 | 0.785 | 0.775 | 0.785 |
| Scuff Resistance | | | | | |
| Rating | 2.5 | 1.5 | 4 | 3.5 | 3 |

A scuff resistance test was conducted in the following manner: a Nike Victory Red forged standard sand wedge (loft: 54°; bounce: 12°; shaft: True Temper Dynamic Gold shaft; flex: S) is fixed to a swing robot manufactured by Miyamae Co., Ltd. and then swung at the head speed of about 32 m/s. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about 3/4 of an inch above the sole and was centered toe to heel across the face. Three samples of each ball were tested. Each ball was hit three times.

Other methods may also be used to determine the scuff resistance, such as the methods described in the commonly assigned copending application titled "Golf Ball Wear Indicator", U.S. application Ser. No. 12/691,282, filed Jan. 21, 2010, in the name of Brad Tutmark.

After the above described scuff resistance testing, each golf ball cover was visually observed and rated according to the following scale: a golf ball cover was rated "1" when little or no damage was visible, only groove markings or dents; a golf ball cover was rated "2" when small cuts and/or ripples in the cover were apparent; a golf ball cover was rated "3" when moderate amounts of cover material were lifted from the ball's surface, but the cover material was still attached to the ball; and finally a golf ball cover was rated "4" when cover material was removed or barely attached to the golf ball.

Shore D hardness values of the core and cover layer were measured on the spherical surface of the layer to be measured by using a Shore D hardness tester.

As shown in Table 5, golf ball examples 1 and 2 made from compositions including a cross-linked thermoplastic polyurethane elastomer having cross-links located in the hard segments, where the cross-links are the reaction product of unsaturated bonds located in the hard segments as catalyzed by a free radical initiator and a proper ratio of the organic isocyanate to the long chain polyol, provides superior scuff resistance.

Two additional golf balls of this disclosure and 3 additional comparative example golf balls were made in accordance with the exemplified method, with inner core material selected from Table 6, outer core material from Table 2, inner cover material from Table 3, and outer cover material from Table 4.

TABLE 6

| Inner Core Materials | |
|---|---|
| Resin: | M |
| HPF 2000* | 45 |
| HPF AD 1035* | 35 |
| Masterbatch** | 20 |

*HPF 2000 and HPF AD 1035 are trade names of ionomeric resins by E. I. DuPont de Nemours and Company.
**Masterbatch comprises 40 wt percent Surlyn ® 8940 and 60 wt percent barium sulfate.

TABLE 7

Golf Ball Testing Data

| | Examples | | Comparative examples | | |
|---|---|---|---|---|---|
| | 3 | 4 | 6 | 7 | 8 |
| Inner Core Layer | | | | | |
| Material | M | M | M | M | M |
| Diameter (mm) | 24 | 21 | 24 | 21 | 24 |
| Shore D Hardness | 53 | 53 | 53 | 53 | 53 |
| Compression Deformation (mm) | 3.5 | 3.5 | 3.5 | 3.5 | 3.5 |
| COR | 0.799 | 0.799 | 0.799 | 0.799 | 0.799 |
| Outer Core Layer | | | | | |
| Material | C | C | C | C | C |
| Thickness (mm) | 7.25 | 8.75 | 7.25 | 8.75 | 7.25 |
| Shore D Hardness | 59 | 59 | 59 | 59 | 59 |
| Inner Cover Layer | | | | | |
| Material | E | E | E | E | E |
| Thickness (mm) | 1.0 | 1.0 | 1.0 | 1.0 | 1.0 |
| Shore D Hardness | 69 | 68 | 69 | 68 | 69 |
| Flexural Modulus (psi) | 77,000 | 77,000 | 77,000 | 77,000 | 77,000 |
| Outer cover layer | | | | | |
| Resin | F | G | H | I | J |
| Thickness (mm) | 1.1 | 1.1 | 1.1 | 1.1 | 1.1 |
| Shore D Hardness | 54 | 54 | 53 | 53 | 53 |
| Flexural Modulus(psi) | 520 | 540 | 480 | 490 | 490 |
| 100% Modulus (kg/cm$^2$) | 120 | 125 | 105 | 110 | 110 |
| Ball | | | | | |
| COR | 0.785 | 0.785 | 0.784 | 0.785 | 0.785 |
| Scuff Resistance | | | | | |
| Rating | 2.0 | 1.5 | 4 | 3.5 | 3 |

As shown in Table 7, golf ball examples 3 and 4 made from compositions including a cross-linked thermoplastic polyurethane elastomer having cross-links located in the hard segments, where the cross-links are the reaction product of unsaturated bonds located in the hard segments as catalyzed by a free radical initiator and a proper ratio of the organic isocyanate to the long chain polyol, provides superior scuff resistance. Also, the 100% modulus is within the range of modulus that provides a soft feel when struck, even though the golf balls exhibit favorable scuff resistance as compared with the golf balls that are comparative examples.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims. For example, different golf ball precursors, perhaps one having a different number of layers or a different core composition, also fall within the scope of the claims.

We claim:

1. A golf ball comprising:
   a golf ball precursor, the precursor comprising at least one preselected golf ball layer but not an outer cover layer, and
   an outer cover layer that:
   (1) comprises a moisture-cured, crosslinked, thermoplastic polyurethane elastomer formed by reacting a mixture of
   (a) an unsaturated diol having two primary hydroxyl groups and at least one allyl ether group of the formula

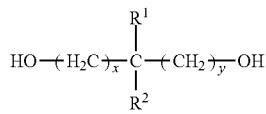

in which $R^1$ is a substituted or unsubstituted alkyl group, substituted or unsubstituted aryl group, substituted or unsubstituted alkyl-aryl group, substituted or unsubstituted ether group, substituted or unsubstituted ester group, a combination of these, or H, and optionally includes an unsaturated bond in any main chain or side chain of any group; $R^2$ comprises an allyl group optionally attached by a substituted or unsubstituted alkylene group, substituted or unsubstituted arylene group, substituted or unsubstituted alkylarylene group, substituted or unsubstituted ether group, or substituted or unsubstituted ester group; and x and y are integers independently having a value from 1 to 10, (b) a polyisocyanate, (c) a polyol having a molecular weight between about 500 and about 4000, and—optionally (d) a chain extender having at least two isocyanate-reactive sites and a molecular weight less than about 450; wherein a free radical initiator induces crosslinking of the allyl group and, if present, the optional unsaturated bond of $R^1$, the mixture having an NCO index of from about 1.06 to about 1.18; and
   (2) has a 100% modulus of from about 80 to about 130 kg/cm$^2$.

2. The golf ball according to claim 1, wherein the outer cover layer has a flexural modulus of less than about 1,000 psi.

3. The golf ball according to claim 1, wherein the golf ball precursor comprises
   an inner core layer, the inner core layer comprising at least a thermoplastic material;
   an outer core layer substantially surrounding the inner core layer, the outer core layer comprising a thermoset rubber composition; and
   an inner cover layer substantially surrounding the outer core layer, the inner cover layer having a surface Shore D hardness of at least about 60.

4. The golf ball according to claim 3, wherein the thermoplastic material of the inner core layer comprises a blend of two highly neutralized acid polymers.

5. The golf ball according to claim 4, wherein the inner core layer has a diameter of from about 21 mm to about 28 mm and a compression deformation of from about 3.4 mm to about 4.2 mm.

6. The golf ball according to claim 5, wherein the outer core layer has a thickness of from about 5 mm to about 9 mm.

7. The golf ball according to claim 6, wherein the outer core layer has a surface Shore D hardness of from about 50 to about 60.

8. The golf ball according to claim 7, wherein the inner core layer has a coefficient of restitution that is lower than the coefficient of restitution of the outer core layer.

9. The golf ball according to claim 8, wherein the golf ball has a coefficient of restitution of less than about 0.8.

10. The golf ball according to claim 7, wherein the outer cover layer has a surface Shore D hardness of from about 53 to about 57 and the inner cover layer has a surface Shore D hardness of from about 60 to about 70.

11. The golf ball according to claim 1, wherein the inner cover layer has a thickness of less than about 1.2 mm.

12. The golf ball according to claim 11, wherein the outer cover layer has a surface Shore D hardness of from about 53 to about 57.

13. The golf ball according to claim 1, wherein the unsaturated diol is trimethylolpropane monoallyl ether.

14. The golf ball according to claim 13, wherein the outer cover layer has a flexural modulus of less than about 800 psi.

* * * * *